INVENTOR.
MOISE LEVY GOLDBERG

United States Patent Office 3,443,393
Patented May 13, 1969

3,443,393
TRIPLE POINT DESALINATION SYSTEM UTILIZING A SINGLE LOW PRESSURE VESSEL AND A GRAVITY SEA WATER FEED
Moise Levy Goldberg, 8 Jabotinsky St.,
Tel-Aviv, Israel
Filed Jan. 17, 1967, Ser. No. 609,855
Int. Cl. G02b 1/12; B01d 9/04
U.S. Cl. 62—124                                    15 Claims

ABSTRACT OF THE DISCLOSURE

A desalination system in which sea water is cooled by successive heat exchangers and then introduced as jets into a vacuum chamber in a single low pressure vessel where at a triple sea water transformation point a portion of the sea water evaporates, a portion is frozen into ice crystals and the remainder is concentrated into brine. The ice crystals are washed with a mixture of compressed air and fresh water and thereafter melted, being used in a heat exchanger. The brine is withdrawn from the low pressure vessel and is used in heat exchangers. The vapors are cooled in a heat exchanger within the low pressure vessel, thereafter are compressed, although still at a subatmospheric pressure, and introduced into a compartment in the low pressure vessel where they contact a heat exchanger and are condensed into fresh water which is withdrawn. The incoming sea water initially is pumped to a level higher than the jets, so that it can flow by gravity through heat exchangers on its way to the jets without pumping.

BACKGROUND OF THE INVENTION

Field of the invention

The invention relates to a desalination system using a triple sea water transformation point wherein sea water is introduced into a cold vacuum region under conditions which cause part of the seat water to evaporate, the heat withdrawn for evaporation freezing a portion of the sea water into ice crystals, while the remainder of the sea water is concentrated into brine. The vapors subsequently are compressed and condensed into fresh water and the ice crystals are melted into fresh water. The fresh water is withdrawn from the system.

DESCRIPTION OF THE PRIOR ART

It has been proposed heretofore to desalinate sea water by a vacuum freeze-vapor compression process. In this prior process the incoming sea water is cooled by fresh water and brine heat exchangers, being forced through the heat exchangers by pumps. The cooled sea water then is introduced into a pool at the bottom of a first low pressure vessel. Above this pool a low pressure is maintained such that a triple sea water transformation point prevails, whereby vapor rises from the pool, ice crystals are formed in the pool and the sea water in the pool is concentrated into brine. The vapor rises in this first vessel to a compressor which increases the pressure of the vapor, although still keeping it at a subatmospheric pressure. The compressed vapor is cooled by an ammonia heat exchanger which causes some of the vapor to condense into fresh water. The balance of the vapor is lead to a second low pressure vessel. Brine and ice crystals from the pool in the first vessel are transferred to the second vessel where the ice crystals are separated from the brine and are led into direct contact with the incoming stream of compressed vapor so as to condense the same and melt the crystals to fresh water.

The installation and maintenance of two such large vessels is costly. Furthermore, the use of pumps to force the incoming sea water through heat exchangers on its way to the evaporation region is likewise costly. Moreover, the use of ammonia to cool the compressed low pressure vapor represents a considerable expense. Still further, the ice crystals are not sufficiently cleansed of brine before melting.

SUMMARY OF THE INVENTION

The present invention provides a system which overcomes the difficulties of the prior art by carrying out all of the low pressure operations in a single large vessel rather than a pair of vessels, by eliminating the use of pumps for feeding the sea water to the flash evaporation point by using a high level storage tank, by cooling the compressed vapor with an ice crystal heat exchanger rather than an ammonia heat exchanger, and by using a better device for cleansing the ice crystals.

In general, the apparatus of my present invention passes sea water through a filter into a de-aerator. Then the sea water is raised, as by pumping, to a storage tank. Preferably, the water level in the storage tank is higher than the level at which the sea water is introduced into the flash evaporation zone, so that the stored sea water will flow by gravity without the use of pumps. Moreover, the level of the sea water in the storage tank is maintained at a predetermined point in order to assist in controlling the rate of flow of sea water to the flash evaporation zone. The height of the storage tank also is related to the degree of vacuum maintained in the flash evaporation zone (about 3.3 mm. of mercury) so as to obtain a desirable rate of flow of the sea water from the storage tank to the flash evaporation zone through various heat exchangers on the way to said zone. The first heat exchanger through which the sea water passes after it leaves the storage tank is a fresh water heat exchanger. The cooling medium is cold product fresh water which is produced in a manner that will be described later. The second heat exchanger through which the sea water passes is a brine heat exchanger, the cooling medium here being the deeply cooled brine which leaves the flash evaporation zone and is pumped out of the low pressure vessel. The sea water, when it leaves the brine heat exchanger, is at a temperature of approximately —10° C. Thereafter, the cooled sea water flows through a mechanical refrigerator, for example, a refrigerator of the compression-expansion type. This refrigerator supercools the sea water to below its freezing point in order to create small nuclei of ice crystals. The supercooled sea water is introduced into a vacuum chamber in such a fashion that flash evaporation is encouraged as distinguished from merely flowing into a pool at the bottom of a vessel, as heretofore has been the case. For this purpose, the water is introduced in the form of thin films or drops, e.g., jets. It is not necessary to pump the cold sea water into the vacuum chamber because a high speed of inflow is created by the very low pressure within said chamber.

The chamber is maintained at the triple sea water transformation vacuum of about 3.3 mm. of mercury. The heat of evaporation of the vaporizing sea water forms ice crystals and concentrates the remaining sea water into brine.

The rising vapor is at a temperature of about —1.9° C. and the brine is about —2.9° C. The ice crystals and brine fall to the bottom of the low pressure vessel where they form a pool of mixed ice crystals and brine. Approximately one pound of vapor is former for each seven and one-half pounds of ice crystals formed. The proportion of ice crystals to brine are constantly agitated in the pool. The ice crystals and brine are pumped out of the vacuum chamber to a covered vessel at atmospheric pressure where the ice crystals rise to the top of the brine, are mechanically removed, and are blasted with compressed cold air and cold product fresh water to remove the film of brine adhering to the ice crystals.

The cleansed ice crystals are used in a manner soon to be described.

The water vapor rising from the flash evaporation zone is cooled to a temperature slightly lower than —1.9° C. by passage through a heat exchanger in the low pressure vessel. The cooling medium of this heat exchanger is the brine pumped out of the low pressure vessel which, as will be recalled, is at a temperature of about —2.9° C. If desired, a mechanical refrigerator may be employed to lower the temperature of the brine passing through said heat exchanger and thereby lower the temperature of the water vapor without condensing it at this point. Said brine, after cooling the water vapor above the flash evaporation zone, is led to the brine-incoming sea water heat exchanger after which the brine leaves the system. The water vapor leaving the flash evaporation zone is drawn through the brine heat exchanger by a radial fan-type compressor which maintains the pressure of the flash evaporation region at about 3.3 mm. of mercury and which has a discharge pressure of about 6 mm. of mercury. Attention is drawn to the comparatively high outlet pressure of this fan which is approximately 1 mm. of mercury in excess of that obtained with compressors of comparable prior art systems. I have achieved this higher pressure with my fan by employing bearings that are cooled by a circulating fluid medium, thus enabling the compressor to rotate at a high speed which would normally by considered excessive, for instance, in the range of 30,000 r.p.m. to 35,000 r.p.m. Moreover, I prevent the tips of the radial compressor blades from flying off by employing a reinforcing ring which circumscribes said tips and holds them in fixed position. Furthermore, increasing the inertial moment of the fan by providing a ring at the tip of the blades enables the fan to be turned at higher speeds.

The vapor which now has been compressed to about 6 mm. of mercury, and which has had its temperature thereby correspondingly slightly elevated, is passed through a heat exchanger which, unlike the heat exchanger of the prior art that used ammonia as the cooling medium, employs ice crystals with a product fresh water lubricant as the cooling medium. It will be observed that these ice crystals are held out of direct contact with the compressed water vapor by the mechanical structure of the heat exchanger. At the given pressure, to wit, about 6 mm. of mercury, and the temperature of the ice crystals, the compressed water vapor will condense to form product fresh water and at the same time melt the ice crystals. The product fresh water is led to an atmospheric storage chamber where it is joined to the product fresh water formed by melting the ice crystals in the manner just described.

DESCRIPTION OF THE PREFERRED EMBODIMENT

Figures 1, 6:
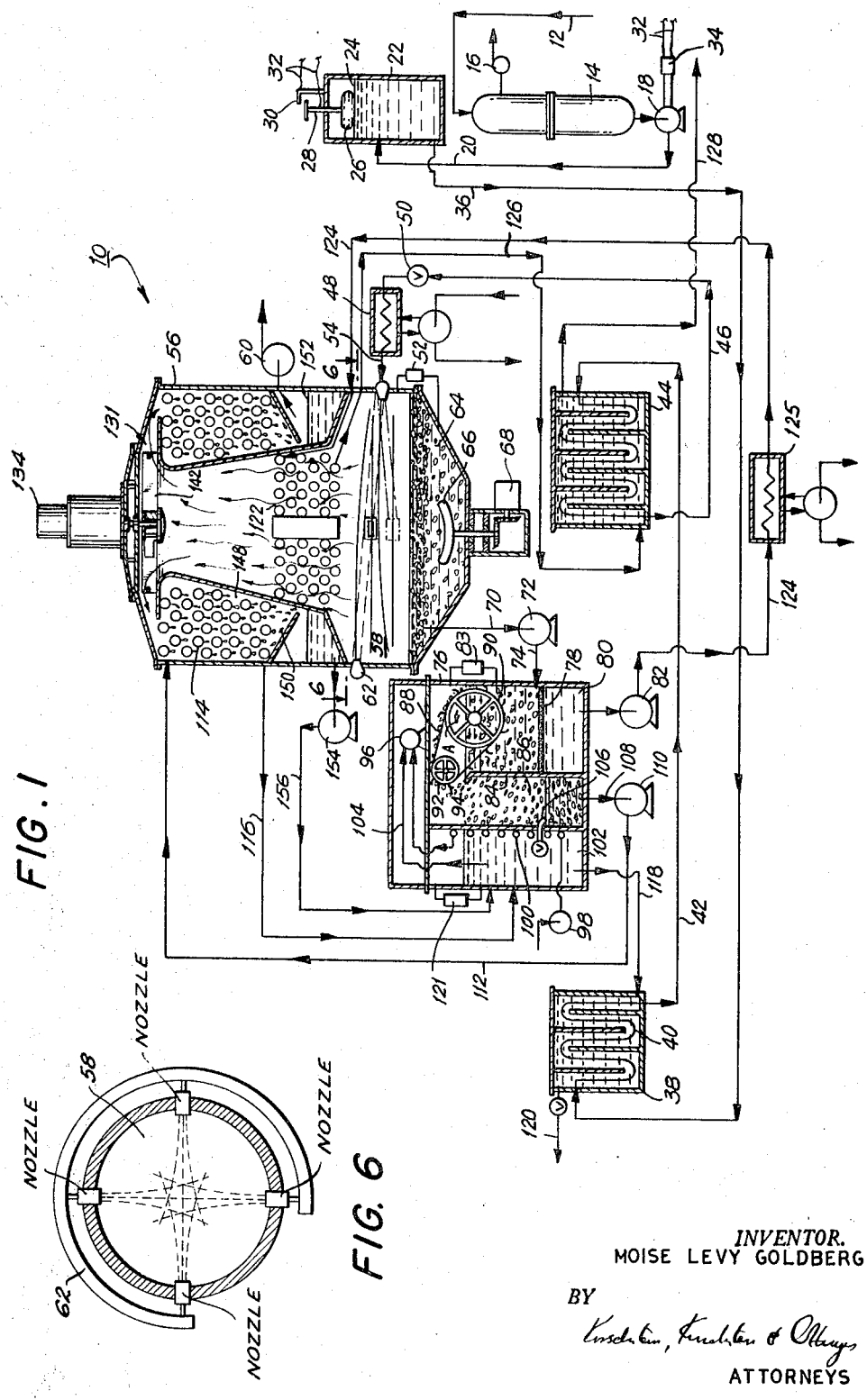
FIG. 1 is a diagrammatic view of an apparatus for carrying out my new system.
FIG. 6 is a reduced sectional view taken substantially along the line 6—6 of FIG. 1.
Figure 2:
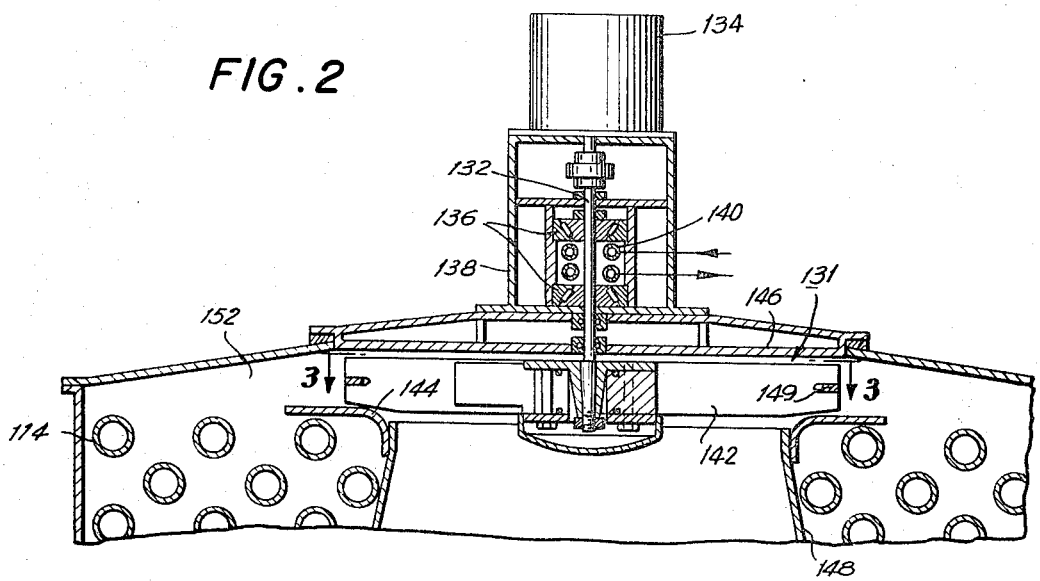
FIG. 2 is an enlarged vertical central cross-sectional view of a portion of the apparatus shown in FIG. 1, the same constituting the top of the single large low pressure vessel and the fan-type compressor.
Figure 4:
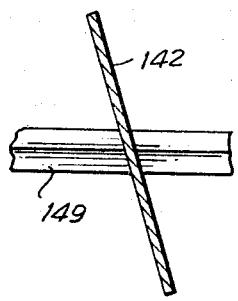
FIGS. 4 and 5 are enlarged sectional views taken substantially along the lines 4—4 and 5—5, respectively, of FIG. 3.
Figure 3:
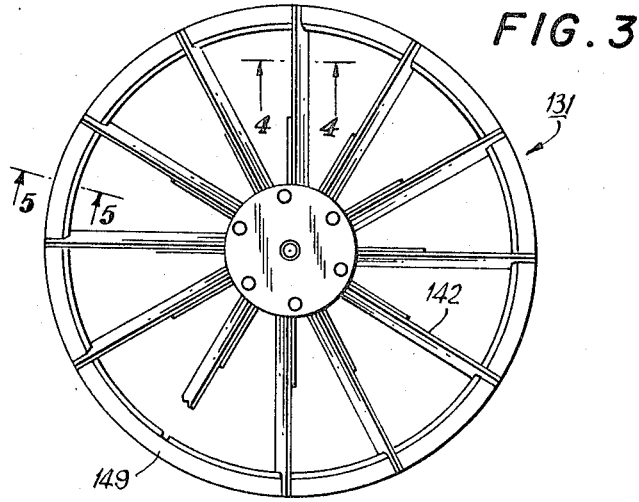
FIG. 3 is a sectional view taken substantially along the line 3—3 of FIG. 2.
Figure 5:
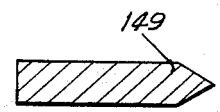

Referring now in detail to the drawings, the reference numeral 10 denotes a plant embodying my invention and for carrying out the method thereof. For the purpose of brevity, I will describe the apparatus and process simultaneously.

Salt water is drawn from the sea by an intake pump (not shown) and passes through a filter (not shown) and, if desired, through an ion exchanger. The sea water now enters a pipe 12 that leads to a de-aerator 14 having an air removal pump 16. A pump 18 draws sea water from the bottom of the de-aerator and feeds it through a pipe 20 to an elevated storage tank 22. This storage tank is high enough to cause the sea water to flow from the tank through various heat exchangers to the vacuum chamber without the use of pumps. The storage tank is vented to the atmosphere. I provide suitable means to prevent re-absorption of air by the stored sea water. Such means may constitute a thin film of oil or any other water immiscible non-toxic fluid floating on the upper surface of the water in the tank. As shown, said means constitutes a thin rubber membrane 24 having its periphery sealed to the tank. The membrane is sufficiently elastic to permit the volume of water stored in the tank to vary considerably.

A float 26 resting on the membrane controls a movable contact 28 arranged to cooperate with a stationary contact 30. Lead wires 32 run from the contacts to a motor control 34 for the motor of the pump 18, the control being such that when the contacts engage, the pump 18 is idled. Thereby, a substantially constant level of water in the storage tank will be maintained.

Sea water leaves the storage tank through a pipe 36. The pipe 36 runs to a product cold water external heat exchanger 38 of any simple type, herein shown as constituting a chamber subdivided into various subchambers by baffle partitions. A cooling medium flows through the subchambers, said cooling medium constituting the product cold water about to leave the plant. The sea water is passed through the subchambers by means of convoluted pipes 40.

After leaving the product cold water external heat exchanger, the cooled sea water passes through a pipe 42 which leads to a second external heat exchanger 44 wherein the cooling medium is cold brine about to leave the plant 10. The heat exchanger 44 likewise is preferably of a simple type and may be of the same general physical form as the heat exchanger 38.

It is pointed out that both heat exchangers are covered, so that the coolant passageways may be completely filled with the cooling media and also in the case of the product fresh water, so that it may be prevented from becoming contaminated.

The sea water, when it leaves the brine heat exchanger, is at a temperature of approximately —1° C. A pipe 46 leads the deeply cooled sea water from the brine heat exchanger to a mechanical refrigeration cooling means 48 which, as shown, is of the compression expansion type. This refrigeration cooling means will reduce the temperature of the sea water to slightly below the freezing temperature thereof, i.e., supercools it by a small amount, whereby to induce the formation of small nuclei of ice crystals so as subsequently to encourage speedy ice crystal formation.

A valve 50 in the pipe 46 controls the rate of flow of the sea water on its way from the storage tank to the flash evaporation zone. Said valve is regulated by a level gauge 52 which is responsive to the level of the pool of concentrated brine and ice crystals at the bottom of the low pressure vessel. When the level rises beyond a predetermined point, the valve 50 is partially closed to reduce the rate of inflow.

From the mechanical refrigerator 48 the supercooled sea water is led by a pipe 54 to a low pressure vessel 56 and specifically to a vacuum chamber 58 within said vessel. The pressure within the vacuum chamber is maintained at about 3.3 mm. of mercury absolute in a suitable manner. As shown, this is accomplished by an air removal vacuum pump 60 the intake of which is connected to another chamber, soon to be described, within the low pressure vessel 56. The supercooled sea water is introduced into the vacuum chamber 58 in such a manner as to assume a form presenting a very large surface of evaporation. This form may either be constituted by thin films or by droplets.

One such arrangement which I have shown constitutes a helical manifold 62 connected to the pipe 54 and winding about the exterior of the low pressure vessel 56. Leading inwardly from the manifold through the walls of the low pressure vessel are a series, for example, four, of horizontal nozzles disposed about 90° apart.

The nozzles may be constructed, as by utilization of a central diversionary plug, to induce the formation of mist as the seat water skirts into the vacuum chamber, or, as illustrated, the nozzles may be terminated inwardly of the vacuum chamber in horizontally disposed thin oblong openings, so that the sea water leaving the nozzles assumes the form of thin horizontal films. These films cross one another centrally of the vacuum chamber. In any event, the sea water, as it enters the vacuum chamber, is broken up into tiny drops, or other physical forms, of dimensions having a large surface area to over-all mass ratio which encourages speedy flash evaporation.

It is pointed out that the sea water is able to flow from the storage tank to the nozzles under a gravity head without the aid of pumps. However, the sea water is drawn rapidly into the vacuum pump so as to form the thin films by the suction action of the vacuum in the chamber 58 and also by the evacuating action of a brine-ice crystal pump soon to be described.

The evaporation of the sea water in the vacuum chamber takes place under triple sea water transformation point conditions which are by themselves well known. In other words, the temperature and the pressure at which the evaporation takes place are such that vapor, sea water and ice crystals can exist side by side and under these conditions some of the sea water will turn into fresh water vapor and the heat required to thus vaporize the water is drawn from the balance of the sea water to in turn cause the formation of ice crystals and concentration of the remainder of the sea water into brine. It has been found that about one pound of vapor is produced for each seven and one-half pounds of ice crystals that are formed.

The water vaporizes in the vacuum chamber and its processing will be described at a later point.

The ice crystals and the residue of brine which has become concentrated due to the removal of some fresh water as vapor and some fresh water as ice crystals drops down along with the ice crystals into a pool 64 at the bottom of the low pressure vessel 56. The level of this pool is sensed by the level gauge 52 which, as noted aforesaid, regulates the valve 50. To prevent the ice crystals from caking into a mass and to increase the efficiency of formation of the ice crystals, I provide an agitating means such, for instance, as a propeller 66, near the bottom of the pool driven through a suitable gear train by a motor 68.

The slurry of ice crystals and brine is drawn off from the pool through a pipe 70 by a pump 72. The operation of the pump likewise is regulated by the level gauge 52, the speed of the pump being increased when the pool rises above a predetermined level and decreasing when the pool falls below a predetermined level.

The mixture of ice crystals and brine leaving the pump 72 is discharged through a pipe 74 into a separating chamber 76. The bottom of the separating chamber is defined by a foraminous plate 78, thereby ensuring that the ice crystals remain in the upper part of the chamber where they will tend in any event to rise due to their lower density. The brine in the chamber 76 descends into an accumulation chamber 80 through which it is withdrawn by a pump 82 controlled by a level gauge 83 which senses the level of the brine and ice in the separating chamber 76. The gauge de-energizes the pump 82 when the level of the brine and ice approaches the top of the chamber 76. The circulation of the exiting brine will be discussed later. However, it may be pointed out here that its temperature is about −2.9° C. One side of the chamber 76, 80 is defined by a partition 84. Said partition provides a boundary between the chambers 76, 80 and an ice storage chamber 86.

Ice is removed from the brine in the separating compartment 76 in any suitable fashion. The equipment employed for this purpose can be of simple design, inasmuch as, unlike the prior art, the ice is separated not within a low pressure tank but at ambient atmospheric pressure, and access to the ice removal apparatus therefore can readily be gained. Said ice removal apparatus constitutes an endless perforate screen belt 88 trained about a pair of horizontal drums 90, 92. The drum 90 is of larger diameter and is located well within the separating chamber 76. The drum 92, which is the discharge drum, is located above the ice storage chamber 86 and above and adjacent the top edge of the partition 84. Either one of the drums is motor driven in such a direction that the top flight of the screen belt moves from right to left, as shown in FIG. 1. The screen is provided with a plurality of scoops 94 so arranged that when the drums and screen belt are moved in the direction indicated by the arrow A, the scoops will pick up ice as they move upwardly on the right-hand side of the drum 90.

At the point of discharge the ice is clear of the separating chamber 76 and the scoops are inverted, i.e., turned upside down, thereby discharging ice into the ice storage chamber 86 on the left-hand side of the partition 84. The partition 84 defines the zone of demarkation between the brine which is on the right of the partition and the product fresh water which is on the left of the partition, most of the water at this time still being in the form of ice crystals.

The ice, as it is picked up from the separating chamber 76, still has a residual surface film or coating of brine thereon which would contaminate the sweetness of the product fresh water leaving the plant 10. To reduce this salinity, I provide a highly efficient defilmizing arrangement in the form of a mixed air and product sweet water discharge blast directed downwardly onto the ice carried up on the screen belt 86. Specifically, I provide a nozzle or manifold 96 to which air under pressure, e.g., about three atmospheres, is fed by a compressor 98. The compressor feeds its compressed air output, which is obtained from the surrounding atmosphere, to a heat exchanger 100 located in a product fresh water accumulator 102 next to the ice storage chamber 86. From the heat exchanger 100 cold compressed air is led to the nozzles 96. In addition, product cold fresh water is led from the accumulator 102 to the manifold 96 by a pipe 104. The nozzle, i.e., manifold, is elongated and disposed transversely across the screen belt 88 with the discharge of the nozzle directed downwardly onto the screen. The nozzle is of the Venturi type so that the air leaving it will aspirate fresh water from the accumulator 102, the nozzle being so designed that under the pressures prevailing the ratio of compressed air to water is about 3 to 1 parts by weight. Thus, a mixture of cold compressed air and water will be discharged from the nozzle 96 onto the ice leaving the separating chamber. This discharge will substantially clean the surface of the ice crystals with minimum melting and minimum waste of product sweet water. The cleaning water will fall down into the separating chamber 76 where it will slightly dilute the exiting brine.

This arrangement for cleaning the brine results in a particularly low salt contamination of the product fresh water to a point where the salt is only about 250 p.p.m. of the product fresh water.

A valve controlled pipe 106 is located near the bottom of the partition between the chambers 86, 102 and is set to permit a trickle of water to pass from the product fresh water accumulator 102 to the ice storage chamber 86. The water is present for lubricating purposes to facilitate pumping of the ice from said chamber.

A pipe 108 leads from the bottom of the melting chamber to a pump 110 which forces the slurry of ice and product fresh water through a pipe 112 that leads to a heat exchanger 114 located within the low pressure vessel 56. In the heat exchanger 114 the ice crystals are in large part melted for a purpose later to be described, and then are returned through a pipe 116 to the product fresh water accumulator 102.

Product fresh water leaves the accumulator 102 through a pipe 118 which leads to the product fresh water external heat exchanger 38. Thereafter, the product fresh water leaves the plant through a valve controlled pipe 120. Inasmuch as the accumulator 102 is at a higher level than the heat exchanger 38, the outflow of the product fresh water is under gravity. The top of the heat exchanger 38 is closed to prevent leakage of the product fresh water. A level gauge 121 senses the level of the product fresh water in the accumulator 102 and regulates the valve 120 to maintain said level at a predetermined height shortly below the top of the partition 84.

The vapor rising from the triple sea water transformation zone in the vacuum chamber 58 is at a temperature of about −1.9° C. This vapor must be condensed into fresh water and recovered in order to maintain plant efficiency. The first step in condensation of the vapor is to further chill the same. This is accomplished by drawing the vapor through a heat exchanger 122 directly above the vacuum chamber 58 and therefore, of course, located within the single low pressure vessel 56. The heat exchanger 122 conveniently is in the form of a bank of pipes through which a cooling medium is circulated. The cooling medium is the cold brine which has left the pool 64 and has had the ice crystals removed therefrom. The cooling medium thus is fed from the pump 82 through a pipe 124 which leads it to the aforesaid heat exchanger 122, thereby lowering the temperature of the vapor, but not sufficient to condense the same. Optionally, the brine flowing through the pipe 124 is additionally cooled by a mechanical refrigeration unit 125 to further lower the temperature of the vapor exiting from the heat exchanger 122; however, the additional cooling is not enough to condense the vapor at this point. The brine leaving the heat exchanger 122 flows through a pipe 126 to the external brine heat exchanger 44 where it cools the incoming seat water. Thereafter, the brine is discharged through a pipe 128. The discharged brine may be led back to the sea.

To aid in the condensation of the water vapor to the product fresh water it is necessary to compress the vapor cooled by the heat exchanger 122. This operation is performed by a compressor 131 disposed above the vacuum chamber 58 and the heat exchanger 122. The compressor 131 is of a large radial fan type, having a central intake, radial flow, and peripheral discharge. The space into which the fan exhausts is evacuated of air by the air removal pump 60 and the pressure of the vapor at the output of the compressor is about 6 mm. of mercury absolute. The compressor will maintain the pressure of the region immediately above the pool, i.e., the flash evaporation region, at an absolute pressure of about 3.3 mm. of mercury.

The compressor is of a very powerful type inasmuch as it must handle a large volume of vapor and raise the pressure thereof from about 3.3 mm. of mercury absolute to about 6 mm. of mercury absolute. Said compressor constitutes a shaft 132 which is vertically oriented and is located at the top and centrally of the low pressure vessel 56. The shaft is driven by a motor 134. The shaft is rotated at a very high speed, e.g., 30,000 r.p.m. to 35,000 r.p.m., such speed being necessary to handle the amount of vapor which is present and to achieve the pressure differential just described. The shaft is journalled in rotary and thrust bearings 136 which are enclosed in a housing 138 atop the pressure vessel. The bearings 136 are cooled by a heat exchanger 140 that encircles the shaft 132 and is located close to the bearings. Any cooling medium can be used in the heat exchanger 140, for example, sea water or product cold water, or, if desired, mechanical refrigeration. Such cooling of the bearings is highly desirable since it permits the high speed of rotation of the compressor.

The shaft 132 mounts a set of radial compressor blades 142. The blades 142 turn in a compressor casing which is formed by a lower horizontal flat annulus 144 and a horizontal top plate 146. The peripheral space between the annulus and the blade constitutes the exhaust of the compressor and the opening in the annulus constitutes the intake of the compressor. This intake, is, as can be seen form the figures, located at the top of a tapering chimney 148 which leads upwardly from the heat exchanger 122 to the compressor 131.

A flat horizontal ring 149 ties together the tips of the radial compressor blades 142. Said ring stiffens the assembly of the blades, exerts a compressive force at high speeds tending to reduce the bursting stress exerted on the tips of the blades at high speeds of rotation, and increases the moment of inertia of the compressor blade assembly, thus enabling the compressor to be rotated at higher speeds. Attention is directed to the fact that the inner edge of the ring is tapered to increase efficiency of water vapor flow outwardly over the ring. It also will be observed that the blades 142 are cocked, so that their lower edges lead their upper edges, thereby raising the suction input efficiency of the compressor.

The water vapor which has now been raised to a pressure of about 6 mm. of mercury absolute is discharged into an annular condensing chamber 150 located within the low pressure vessel 56 and surrounding the chimney 148. The water vapor has been slightly heated by the compression, but its temperature is still quite low since it was chilled by the heat exchanger 122 prior to its compression. The annular condensing chamber 150 contains the heat exchanger 114 which lowers the temperature of the water vapor discharged from the compressor to a point where condensation will take place. It will be recalled that the cooling medium for the heat exchanger 114 is the slurry of ice crystals and product fresh water withdrawn from the melting chamber 86. The condensed water vapor formed in the chamber 150 falls down into a secondary accumulator 152 which is located within the low pressure vessel beneath the condensing chamber 150. The product fresh water is withdrawn from said accumulator by a pump 154 which feeds the water through a pipe 156 to the primary product fresh water accumulator 102.

All cold portions of the plant are covered with insulation to minimize heat losses.

It will be understood, of course, that all of the compopents of the plant, such, for instance, as pipes, the large low pressure vessel, pumps, compressors, etc. are constructed so as to be readily disassembled for cleaning purposes and that many valves are employed, which are not shown, in order to cut off flow when the plant is idled and is partially disassembled for cleaning.

It thus will be seen that I have provided a system which achieves the various objects of my invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described my invention, I claim as new and desire to secure by Letters Patent:

1. A plant for the desalination of sea water comprising: a single low pressure vessel, a vacuum chamber within said vessel, means conveying sea water into said vacuum chamber, heat exchangers cooling the sea water on its way to the vacuum chamber, means maintaining a vacuum of about 3.3 mm. Hg in said vacuum chamber, said means including a large volume compressor within said low pressure vessel, the sea water being converted into vapor, ice crystals and brine at a triple sea water transformation point in said vacuum chamber, means withdrawing the brine and ice crystals from the vacuum chamber to atmospheric pressure, means separating the ice crystals from the brine, means cleaning the ice crystals of residual brine, means melting the ice crystals into product fresh water, said compressor compressing said vapor to a higher subatmospheric pressure and directing the compressed vapor to a condensing chamber within the low pressure vessel, heat exchanger means in the condensing chamber condensing the compressed vapor into product fresh water, said heat exchanger means including a cooling medium maintained separate from the compressed vapor, means removing air from the condensing chamber, and means withdrawing the product fresh water from the condensing chamber to atmospheric pressure.

2. A plant as set forth in claim 1 wherein the ice crystals are employed as the cooling medium in the heat exchanger that condenses the compressed water vapor into product fresh water.

3. A plant as set forth in claim 1 wherein a heat exchanger is employed to cool the water vapor before the same is compressed.

4. A plant as set forth in claim 3 wherein the cooling medium for the heat exchanger that cools the vapor before the same is compressed is the brine withdrawn from the vacuum chamber.

5. A plant as set forth in claim 1 including refrigerator means for supercooling the sea water before it is introduced into the vacuum chamber.

6. A plant as set forth in claim 1 which further includes a sea water storage tank, said tank being at a level higher than the level at which sea water is conveyed into said vacuum chamber, whereby sea water can flow by gravity alone from the storage tank to the vacuum chamber, there being no pumps in the path of flow of the sea water from the storage tank to the vacuum chamber, and further wherein heat exchangers are provided in said path of flow for reducing the temperature of the sea water.

7. A plant as set forth in claim 6 wherein a valve is included in said path of flow so as to aid in maintaining a predetermined level of brine and ice crystals in the vacuum chamber.

8. A plant as set forth in claim 6 wherein means is included to maintain the sea water in the storage tank at a substantially constant level.

9. In a plant for the desalination of sea water in which at a certain point of operation ice crystals float in a bath of brine and in which the ice crystals are mechanically conveyed to an ice storage chamber, that improvement comprising means for cleansing the surface of the crystals of brine, said means including a perforated transport medium including means to pick the ice up from the brine and transfer it to the ice storage chamber, and means to direct onto the ice on the transport medium a blast comprising a mixture of cool compressed air and cool fresh water.

10. A plant as set forth in claim 9 in which means is included to cool the compressed air in a product cold water accumulator.

11. A combination as set forth in claim 9 wherein the cool compressed air in the blast is present in a greater amount than the cool fresh water.

12. A combination as set forth in claim 9 wherein the ratio of cool compressed air to cool water in the blast is about 3 to 1.

13. In a plant for the desalination of sea water in which means is included providing a vacuum chamber under triple sea water transformation conditions and in which sea water is introduced into said vacuum chamber, that improvement comprising means for feeding the sea water into the vacuum chamber in the form of plural jets spaced around this vacuum chamber and spraying the water into the vacuum chamber at different heights.

14. A combination as set forth in claim 13 in which the jets cross one another centrally of the vacuum chamber.

15. In a plant for desalination of sea water wherein sea water is cooled and then fed into a vacuum chamber in which triple sea water transformation conditions are maintained so as to convert the sea water into vapor, ice crystals and brine, wherein the vapor arises from the vacuum chamber and wherein means is included to compress said vapor prior to condensing the same into product fresh water, that improvement comprising a compressor for effecting the aforesaid compression, said compressor including a vertical shaft, motor means to rotate said shaft at a speed of at least 30,000 r.p.m., bearings supporting said shaft, cooling means for preventing overheating of the bearings, compressor blades carried by the shaft and extending radially therefrom, a housing in which the compressor blades rotate, said housing having a central intake communicating with the vacuum chamber and having a peripheral outlet through which vapor is discharged at a higher subatmospheric pressure, and a ring circumscribing the fan blades and engaging the tips thereof to reinforce the same against bursting, to stiffen the blades and to increase the moment of inertia of the blades, the blades being cocked with the trailing edges thereof remoter from the vacuum chamber than the leading edges.

References Cited

UNITED STATES PATENTS

| | | |
|---|---|---|
| 1,720,863 | 7/1929 | Stebbins. |
| 2,261,463 | 11/1941 | Garve _____ 230—134 |
| 2,565,798 | 8/1951 | Borzell et al. _____ 239—567 |
| 2,819,838 | 1/1958 | Warner _____ 230—128 |
| 3,001,533 | 9/1961 | Holdren _____ 239—567 X |
| 3,159,474 | 12/1964 | Moloney _____ 62—123 X |
| 3,175,372 | 3/1965 | Anderson _____ 62—123 |
| 3,342,039 | 9/1967 | Bridge et al. _____ 62—123 |
| 3,344,616 | 10/1967 | Owen _____ 62—58 |

ROBERT A. O'LEARY, *Primary Examiner.*

WILLIAM E. WAYNER, *Assistant Examiner.*

U.S. Cl. X.R.

62—58; 230—134; 239—567